US012599911B2

(12) United States Patent
Isomura et al.

(10) Patent No.: US 12,599,911 B2
(45) Date of Patent: Apr. 14, 2026

(54) CRUSHING AND CLASSIFYING DEVICE AND METHOD FOR CRUSHING AND CLASSIFYING ELECTRODE MATERIAL

(71) Applicant: TOYOTA JIDOSHA KABUSHIKI KAISHA, Toyota (JP)

(72) Inventors: Keisuke Isomura, Kariya (JP);
Kenichiro Muramatsu, Toyota (JP);
Kazuki Noritake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 18/457,583

(22) Filed: Aug. 29, 2023

(65) Prior Publication Data

US 2024/0165633 A1     May 23, 2024

(30) Foreign Application Priority Data

Nov. 18, 2022     (JP) ................................. 2022-185012

(51) Int. Cl.
| | |
|---|---|
| *B02C 23/10* | (2006.01) |
| *B02C 13/16* | (2006.01) |
| *B02C 13/28* | (2006.01) |
| *B02C 23/14* | (2006.01) |
| *B09B 3/35* | (2022.01) |
| *B09B 101/16* | (2022.01) |

(52) U.S. Cl.
CPC .............. *B02C 23/10* (2013.01); *B02C 13/16* (2013.01); *B09B 3/35* (2022.01); *B02C 2013/2816* (2013.01); *B09B 2101/16* (2022.01)

(58) Field of Classification Search
CPC ......... B02C 23/10; B02C 23/14; B02C 13/16; B02C 2013/2816
See application file for complete search history.

(56) References Cited

FOREIGN PATENT DOCUMENTS

| | | | | |
|---|---|---|---|---|
| JP | 5125828 | B2 | * | 1/2013 |
| JP | 2013-139592 | A | | 7/2013 |
| JP | 2013146701 | A | * | 8/2013 |
| JP | 2013-211234 | A | | 10/2013 |
| JP | 2014199774 | A | * | 10/2014 |
| JP | 2020-053148 | A | | 4/2020 |

OTHER PUBLICATIONS

English translate (JP2014199774A), retrieved date Sep. 28, 2025.*
English translate (JP2013146701A), retrieved date Sep. 28, 2025.*
English translate (JP5125828B2), retrieved date Sep. 28, 2025.*

* cited by examiner

*Primary Examiner* — Mohammed S. Alawadi
(74) *Attorney, Agent, or Firm* — SoraIP, Inc.

(57)     ABSTRACT

The crushing and classifying device of the present disclosure includes a crushing chamber into which an electrode material is inserted, a rotating shaft, a striking body, and a screen. The rotating shaft is disposed in the crushing chamber and rotates under a driving force. The striking body has a rod shape or a chain shape, and is rotatably connected at one end to the rotating shaft, and rotates in the crushing chamber by receiving a centrifugal force associated with the rotating of the rotating shaft. The screen is provided on a wall surface of the crushing chamber, and classifies the crushed electrode material. The striking body includes, at least at its distal end, an edge portion rounded to have a radius of curvature greater than or equal to 1 mm and less than or equal to 9 mm. The screen has an opening that is equal to or less than 5 mm.

4 Claims, 5 Drawing Sheets

B VIEW ON ARROW

C VIEW ON ARROW

A-A
SECTIONAL VIEW

A-A SECTIONAL VIEW

B VIEW ON ARROW

| HAMMER ANGLE R [mm] | GRINDING SIZE [mm2] | PEEL RATE [%] |
|---|---|---|
| 1 | 26.6 | 62.4 |
| 1 | 9.9 | 75.1 |
| 6 | 200.4 | 99.6 |
| 6 | 185.3 | 99.9 |
| 6 | 113.8580757 | 87.36358348 |
| 9 | 111.3056828 | 72.10453734 |
| 9 | 163.5417745 | 83.85090756 |
| 12 | 610.0278198 | 42.3434416 |

CRUSHING AND CLASSIFYING DEVICE AND METHOD FOR CRUSHING AND CLASSIFYING ELECTRODE MATERIAL

CROSS-REFERENCE TO RELATED APPLICATION

This application claims priority to Japanese Patent Application No. 2022-185012 filed on Nov. 18, 2022 incorporated herein by reference in its entirety.

BACKGROUND

1. Technical Field

The present disclosure relates to a technique for crushing and classifying an electrode material of a secondary battery.

2. Description of Related Art

When an electrode material of a secondary battery such as a nickel metal hydride battery or a lithium-ion battery is recycled, it is necessary to separate an active material applied as a paste to the electrode material from a current collector for collection. As the most inexpensive process, there is a method in which the electrode material is crushed and powder containing the active material is sieved and collected. However, in order to sufficiently peel the active material, it is necessary to finely crush the active material over time.

Japanese Unexamined Patent Application Publication No. 2013-139592 (JP 2013-139592 A) discloses a method for separating a current collector and a positive electrode active material from a positive electrode material for a lithium ion battery for collection. In this method, first, the positive electrode material is cut. Next, the cut positive electrode material is sieved using a sieve with an opening of 100 mm to 200 mm, and the positive electrode material is collected on the lower side of the sieve. Then, the positive electrode active material is peeled off from the current collector by applying an impact force to the collected positive electrode material. Further, the positive electrode material is sieved using a sieve with an opening of 0.1 mm to 1.0 mm. The current collector is collected on the upper side of the sieve. The positive electrode active material is collected on the lower side of the sieve.

However, in the method disclosed in JP 2013-139592 A, although the positive electrode material can be finely crushed, there is a possibility that contamination to the powder containing the collected active material increases, and there is a possibility that the powder containing the active material is recompressed to the non-collected material and the yield is lowered. Furthermore, there is a possibility that the separation between the non-collected materials deteriorates.

As a document showing a technical standard of a technical field related to the present disclosure, Japanese Unexamined Patent Application Publication No. 2013-211234 (JP 2013-211234 A) can be shown as an exampled in addition to JP 2013-139592 A.

SUMMARY

The present disclosure has been made in view of the above issue. An object of the present disclosure is to improve collection ability of an active material contained in an electrode material of a secondary battery.

The present disclosure provides a crushing and classifying device to achieve the above object.

The crushing and classifying device according to the present disclosure includes:

a crushing chamber into which an electrode material of a secondary battery is introduced;

a rotating shaft that is disposed in the crushing chamber and that rotates by receiving a driving force;

a striking body of which one end is rotatably connected to the rotating shaft and that rotates in the crushing chamber by receiving a centrifugal force accompanying rotating of the rotating shaft, the striking body having a rod shape or a chain shape; and a screen that is provided on a wall surface of the crushing chamber and that classifies the crushed electrode material, wherein:

the striking body includes an edge portion having a radius of curvature rounded to 1 mm or more and 9 mm or less at least at a distal end of the striking body; and the screen has an opening that is equal to or less than 5 mm.

The present disclosure provides a method for crushing and classifying an electrode material to achieve the above object. The method for crushing and classifying the electrode material according to the present disclosure is a method for crushing and classifying an electrode material of a secondary battery using the crushing and classifying device.

The method for crushing and classifying the electrode material according to the present disclosure includes:

a step of introducing the electrode material into the crushing chamber;

a step of crushing the electrode material by rotating the striking body for a predetermined time;

a step of sieving the crushed electrode material on the screen; and a step of separately collecting powder sieved from the crushed electrode material and the residue in the crushing chamber.

With the technique according to the present disclosure, the electrode material is appropriately crushed so as not to be excessively miniaturized. Therefore, contamination of the non-collected material to the powder containing the active material peeled from the electrode material is suppressed. In addition, the yield is suppressed from being lowered due to recompression of the powder containing the active material to the non-collected material. This improves the collection ability of the active material from the electrode material.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Secondary Battery Dismantling Process

Disassembly of the secondary battery is performed for the purpose of taking out a recyclable substance from among various substances constituting the secondary battery and safely recovering a harmful substance. The material to be recycled is an active material used in the electrode material, particularly an expensive positive electrode active material, and is recovered in the form of a black mass. Iron, copper, and aluminum are also collected for recycling. The electrolyte is recovered as a harmful substance.

Figure 1:
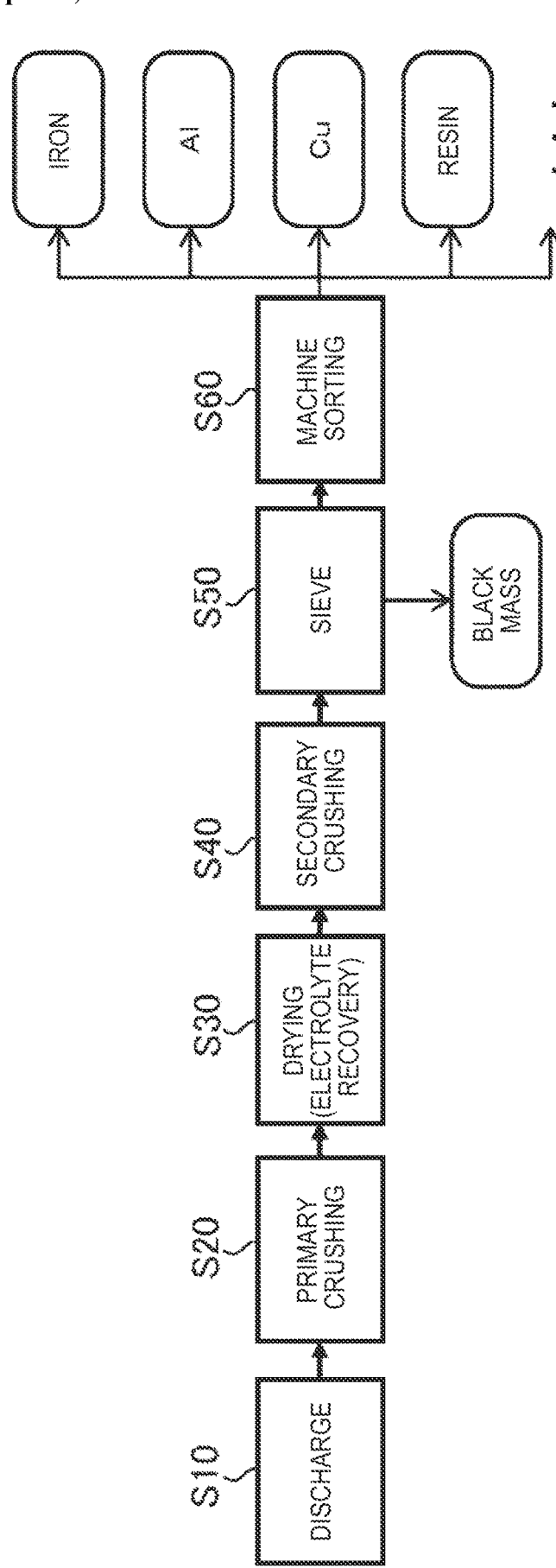
FIG. 1 is a diagram illustrating a disassembly process of a secondary battery according to an embodiment of the present disclosure.

FIG. 1 shows a disassembly process of a secondary battery according to the present embodiment. The disassembly step of the secondary batteries according to the present embodiment includes a discharging step S10, a primary crushing step S20, a drying step S30, a secondary crushing step S40, a sieving step S50, and a mechanical sorting step S60. Hereinafter, the disassembly process of the secondary battery according to the present embodiment will be described.

In the discharging step S10, the secondary batteries are discharged. The reason for discharging the secondary battery is to prevent the separator from melting due to heat generation due to a short circuit when the secondary battery is crushed in a subsequent process. Welding of the molten separator to the electrode material deteriorates recyclability.

In the primary crushing step S20, the case of the secondary batteries is crushed to expose the inner electrode material. By exposing the electrode material, the electrolytic solution adhering to the electrode material can be evaporated and the electrode material can be dried. As a method of crushing the secondary battery, for example, a method of cutting the case of the secondary battery by a shredder is used.

In the drying step S30, the exposed electrode material is dried, and the electrolyte is recovered in the process.

S40 the secondary crushing step, the dried electrode material is crushed to release the active material from the current collector. In the secondary crushing step S40, the crushing may be performed while the electrode assembly is heated. For crushing the electrode material after drying, a crushing and classifying device such as a hammer crusher or a chain crusher described later is used. The electrode material is crushed by operating the crushing and classifying device for a predetermined period of time sufficient to release the active material from the current collector.

The sieving step S50 is a step of sorting an object crushed in the secondary crushing step S40. In the sieving step S50, the powder is selected from the crushed objects. The powder is a black mass containing an active material as a main component. A crushing and classifying device such as a hammer crusher or a chain crusher, which will be described later, is used to sort the powder. Residues remaining in the crushing and classifying device, such as iron, aluminum, copper, and resin, are mechanically sorted by material S60 the mechanical sorting process.

2. Crushing and Classifying Device 2-1. Hammer Crusher

Figures 2A, 2B, 2C, 2D:
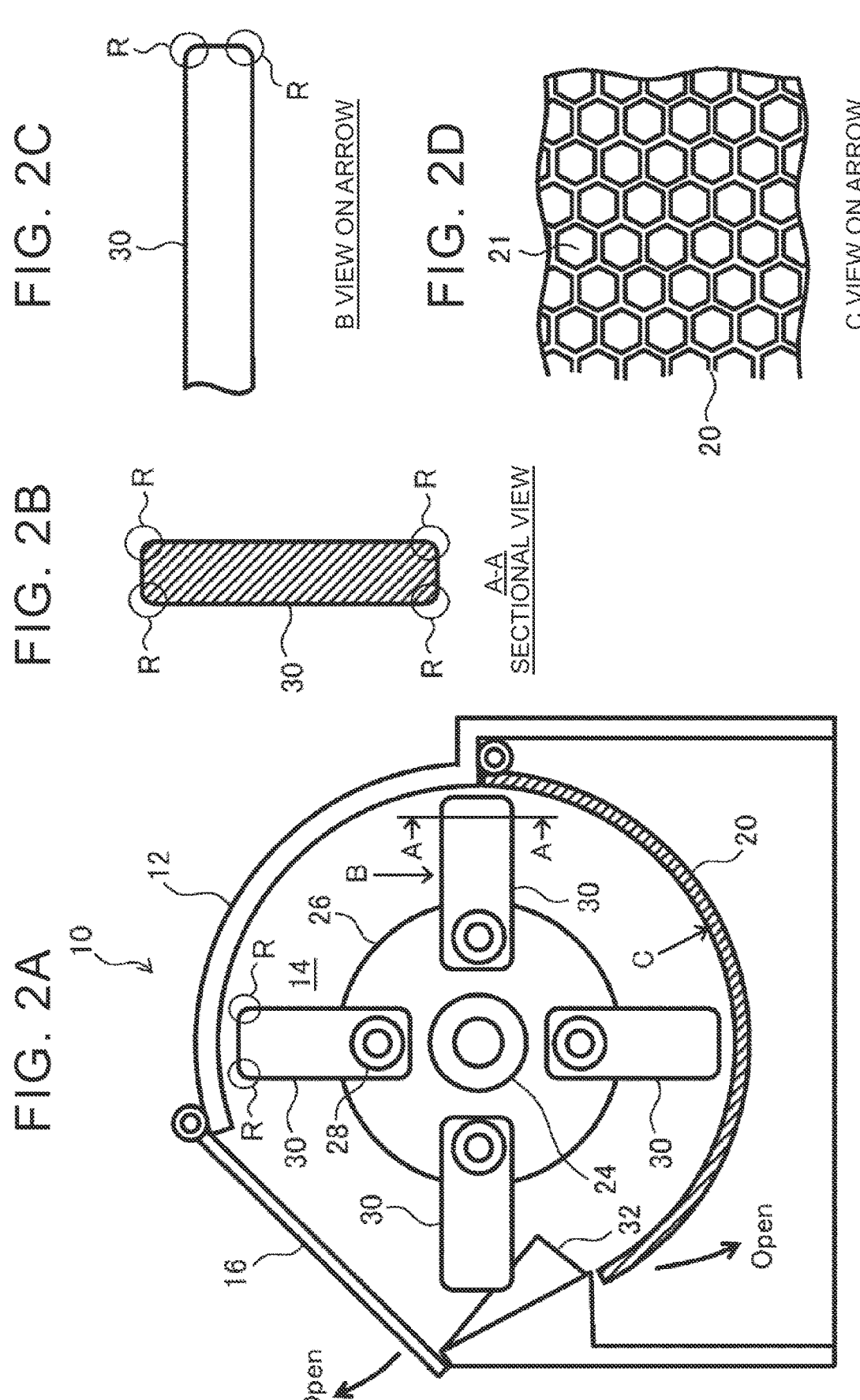
FIG. 2A is a block diagram illustrating a configuration of a hammer crusher according to an embodiment of the present disclosure.
FIG. 2B is a block diagram illustrating a configuration of a hammer crusher according to an embodiment of the present disclosure.
FIG. 2C is a block diagram illustrating a configuration of a hammer crusher according to an embodiment of the present disclosure.
FIG. 2D is a block diagram illustrating a configuration of a hammer crusher according to an embodiment of the present disclosure.

FIG. 2A is a diagram showing the configuration of the hammer crusher according to the present embodiment as a crushing and classifying device. The hammer crusher 10 includes a crushing chamber 14 inside the main body 12. The crushing chamber 14 is provided with an input lid 16. The secondary battery, which is an object to be crushed, is charged into the crushing chamber 14 by opening the input lid 16.

In the crushing chamber 14, a rotating shaft 24 that rotates in response to a driving force from a motor (not shown) is disposed. A rotor 26 is attached to the rotating shaft 24. A plurality of hammers 30 are rotatably connected to a peripheral portion of the rotor 26 via a shaft 28. A plurality of rotors 26 are mounted in the axial direction of the rotating shaft 24. A hammer 30 is attached to each rotor 26. The hammer 30 is a striking body that rotates in the crushing chamber 14 by receiving a centrifugal force caused by the rotating of the rotating shaft 24 when the rotating shaft 24 rotates. Further, the inside of the crushing chamber 14, a fixed blade 32 for shearing the object to be crushed between the hammer 30 is provided.

As shown in FIGS. 2B and 2C, an edge portion of the hammer 30 is provided with an R (referred to as an angle R). The radius of curvature of the angle R is preferably greater than or equal to 1 mm and less than or equal to 9 mm, more preferably greater than or equal to 4 mm and less than or equal to 8 mm. The angle R is provided at least at the tip of the hammer 30, preferably at the entire portion that can hit the crushing object when the hammer 30 is rotated.

A screen 20 for classifying the crushed material to be crushed is provided at the bottom of the crushing chamber 14. The screen 20 constitutes a part of the wall surface of the crushing chamber 14. The screen 20 may be a mesh or a punching metal. However, the opening of the screen 20 is set to be equal to or smaller than 5 mm. More preferred opening sizes are 1 mm or less. If the screen 20 is a mesh as shown in FIG. 2D, the smallest width of the opening is defined as the size of the opening. When the screen 20 is a punching metal having a circular opening, the diameter of the opening is defined as the size of the opening. The screen 20 also serves as a bottom lid of the crushing chamber 14. By opening the screen 20, the residue in the crushing chamber 14 can be removed.

The hammer crusher 10 shown in FIG. 2A is of a vertical rotating type that rotates the hammer 30 in a vertical plane. However, the crushing and classifying device of the present disclosure is also applicable to a horizontally rotating hammer crusher that rotates the hammer in a horizontal plane. In addition, the number of hammers is not limited. There is no limitation on the shape of the hammer except R.

2-2. Chain Crusher

Figures 3A, 3B, 3C:
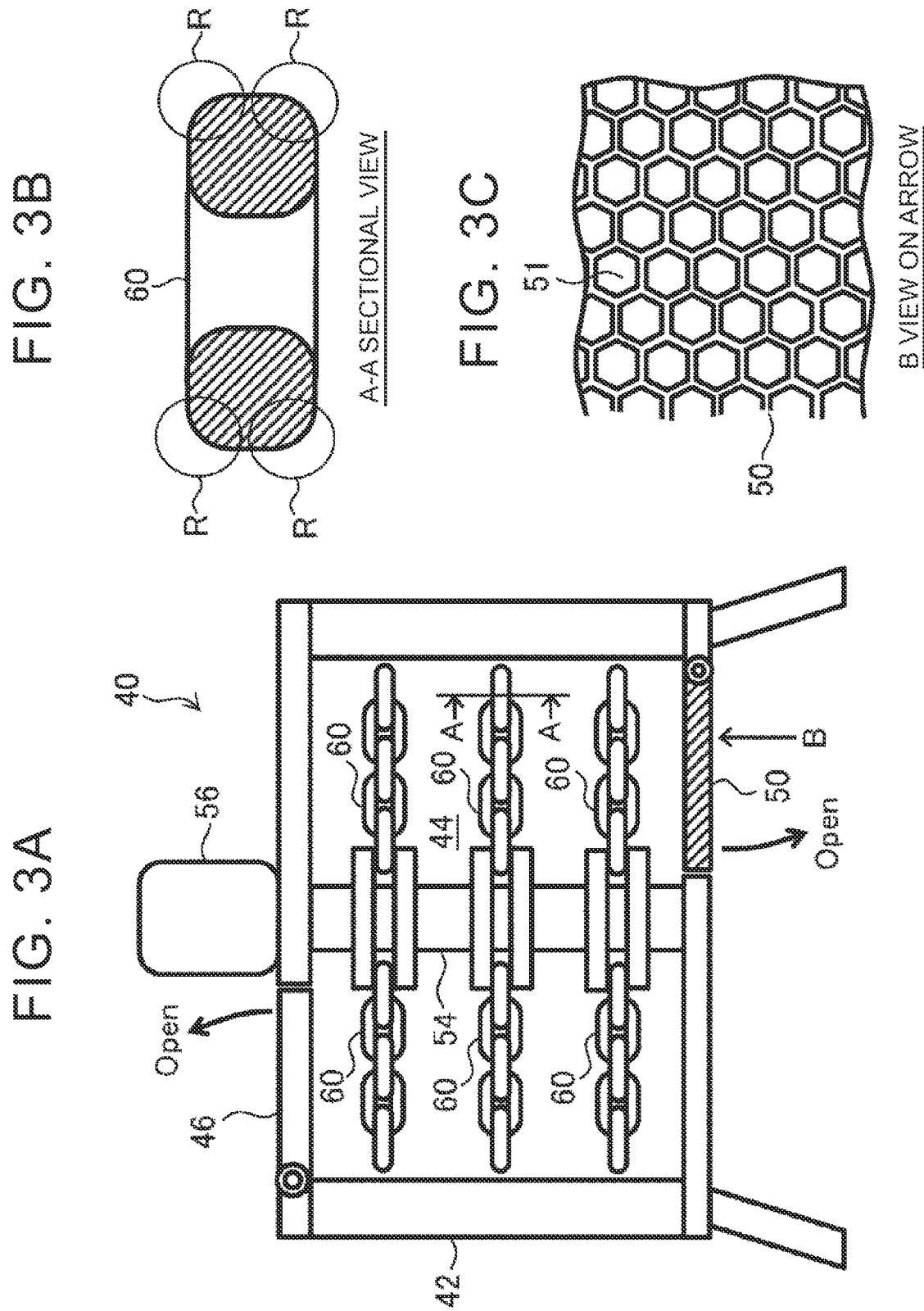
FIG. 3A is a diagram illustrating a configuration of a chain crusher according to an embodiment of the present disclosure.
FIG. 3B is a diagram illustrating a configuration of a chain crusher according to an embodiment of the present disclosure.
FIG. 3C is a diagram illustrating a configuration of a chain crusher according to an embodiment of the present disclosure.

FIG. 3A is a diagram showing the configuration of the chain crusher according to the present embodiment as a crushing and classifying device. The chain crusher 40 includes a crushing chamber 44 inside the main body 42. The crushing chamber 44 is provided with an input lid 46. The secondary battery, which is an object to be crushed, is charged into the crushing chamber 44 by opening the input lid 46.

In the crushing chamber 44, a rotating shaft 54 that rotates in response to a driving force from the motor 56 is disposed. A plurality of chains 60 are attached to the rotating shaft 54. The chains 60 are mounted in a plurality of rows in the axial direction of the rotating shaft 54. The chain 60 is a striking body that rotates in the crushing chamber 44 by receiving a centrifugal force caused by the rotating of the rotating shaft 54 when the rotating shaft 54 rotates.

As shown in FIG. 3B, the edge portion of the chain 60 is provided with an angle R. The radius of curvature of the angle R is preferably greater than or equal to 1 mm and less than or equal to 9 mm, more preferably greater than or equal to 4 mm and less than or equal to 8 mm. The angle R is provided at least at the distal end of the chain 60, preferably at the entire area that can hit the crushing object during rotating of the chain 60.

The bottom of the crushing chamber 44 is provided with a screen 50 for classifying the crushed material to be crushed. The screen 50 constitutes a part of the wall surface of the crushing chamber 44. The screen 50 may be a mesh or a punching metal. However, the opening of the screen 50 is set to be equal to or smaller than 5 mm. More preferred opening sizes are 1 mm or less. If the screen 50 is a mesh as shown in FIG. 3C, the smallest width of the opening is defined as the size of the opening. When the screen 50 is a punching metal having a circular opening, the diameter of the opening is defined as the size of the opening. The screen 50 also serves as a bottom lid of the crushing chamber 44. By opening the screen 50, the residue in the crushing chamber 44 can be removed.

It should be noted that the chain crusher 40 shown in FIG. 3A is a lateral rotating type that rotates the chain 60 in a horizontal plane. However, the crushing and classifying device of the present disclosure is also applicable to a chain crusher of a vertical rotating type in which a chain is rotated in a vertical plane. In addition, the number of chains is not limited. The number of metal wheels constituting the chain is not limited.

3. Test Results 3-1. Test to Determine the Preferred Range of Hammer Angles R

Figure 4B:
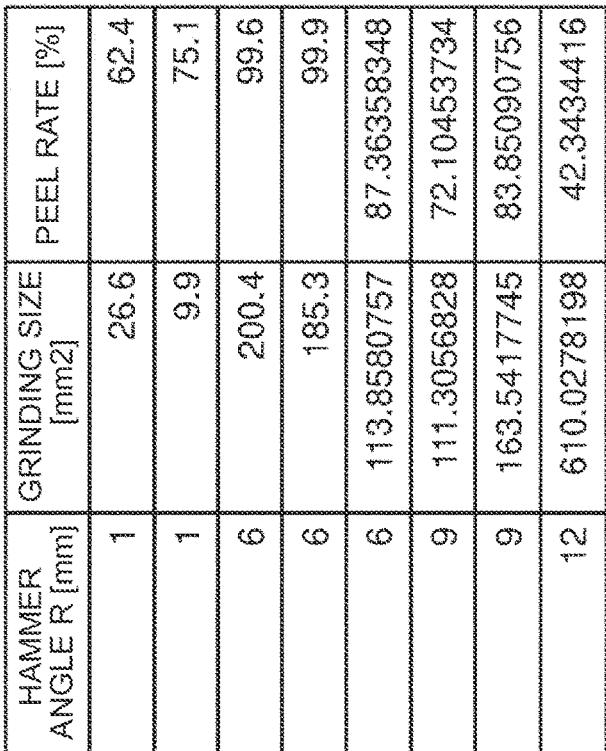
FIG. 4B shows the relation between the angle R of the hammer and the release rate of the active material.
Figure 4A:
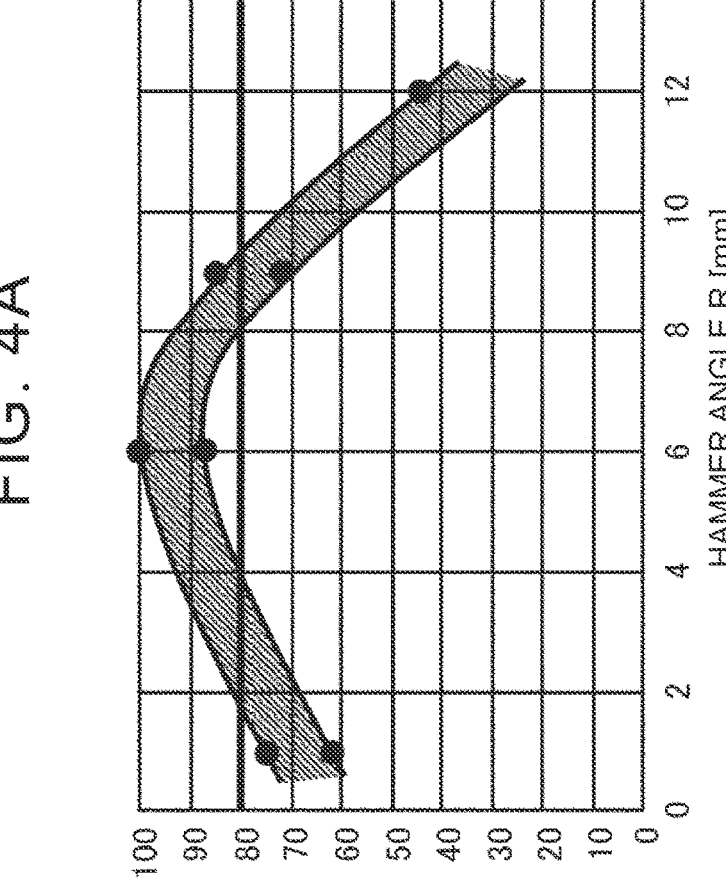
FIG. 4A shows the relation between the angle R of the hammer and the release rate of the active material.

FIGS. 4A and 4B are views showing the relation between the angle R of the hammer 30 of the hammer crusher 10 and the release rate of the active material. In the test, the screen 20 with 5 mm opening was used, and the rotational velocity of the hammer 30 was set to 1100 rpm. A high-power lithium-ion battery (Li2.1) was used as a test piece.

The test was performed twice for the case where the angle R of the hammer 30 was 1 mm, three times for the case of 6 mm, two times for the case of 9 mm, and one time for the case of 12 mm. As a result of the test, it was confirmed that a peel rate of about 62% or more can be obtained when the angle R of the hammer 30 is 1 mm. Further, it was confirmed that a peel rate of about 87% or more can be obtained when the angle R of the hammer 30 is 6 mm. Further, it was confirmed that a peel rate of about 72% or more can be obtained when the angle R of the hammer 30 is 9 mm. On the other hand, when the angle R of the hammer 30 is 12 mm, it was confirmed that the peeling rate is reduced to about 42%. Direct confirmation from the test results is that if the angle R of the hammer 30 is not less than 1 mm and not more than 9 mm, a peel rate of not less than 60% can be obtained. Further, the band shown in FIG. 4A is a predicted band showing the relation between the angle R of the hammer 30 predicted from the test result and the peeling rate. As shown in the predicted zone, from the test results, it is predicted that a peel rate of 80% or more can be obtained when the angle R of the hammer 30 is not less than 4 mm and not more than 8 mm.

From the above confirmation, it can be concluded that the angle R in the range of 1 mm or more and 9 mm or less is the angle R of the preferred hammer 30 if the preferred peel rate is 60% or more. Further, if the preferred peel rate is 80% or more, it can be concluded that the angle R in the range of 4 mm or more and 8 mm or less is the angle R of the preferred hammer 30.

Figure 5:
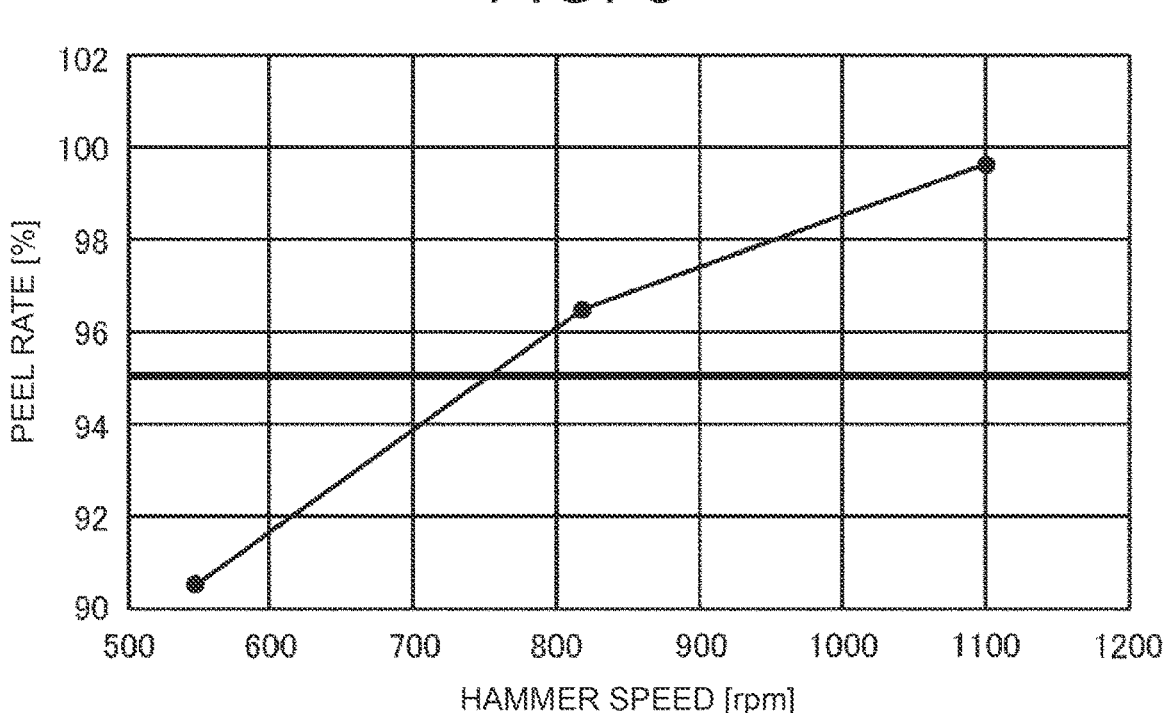
FIG. 5 is a graph showing the relationship between the rotational speed of the hammer and the peel rate of the active material.

3-2. Test to Examine the Relationship Between the Rotational Speed of the Hammer and the Peel Rate FIG. 5 is a diagram showing a result of confirmation of the relationship between the rotating speed of the hammer 30 of the hammer crusher 10 and the release rate of the active material. In the test, the angle R of the hammer 30 was set to 6 mm. When a plurality of rotating speeds were tested, the higher the rotating speed, the higher the peel rate, and the highest peel rate was obtained when the rotating speed was 1100 rpm. However, this does not mean that the rotational velocity at which the peeling rate peaks is 1100 rpm. At rotational speeds above 1100 rpm, there is no significant change in the peel rate, which means that the rotational speed does not need to be higher than 1100 rpm. That is, the higher the rotating speed of the hammer 30 of the hammer crusher 10 is, the more preferable the rotating speed is, but when the rotating speed exceeds a certain rotating speed, the disadvantage due to the increase in the power consumption becomes larger than the merit due to the improvement in the peeling rate.

3-3. Test to Confirm the Release Rate of the Active Material

Figure 6:
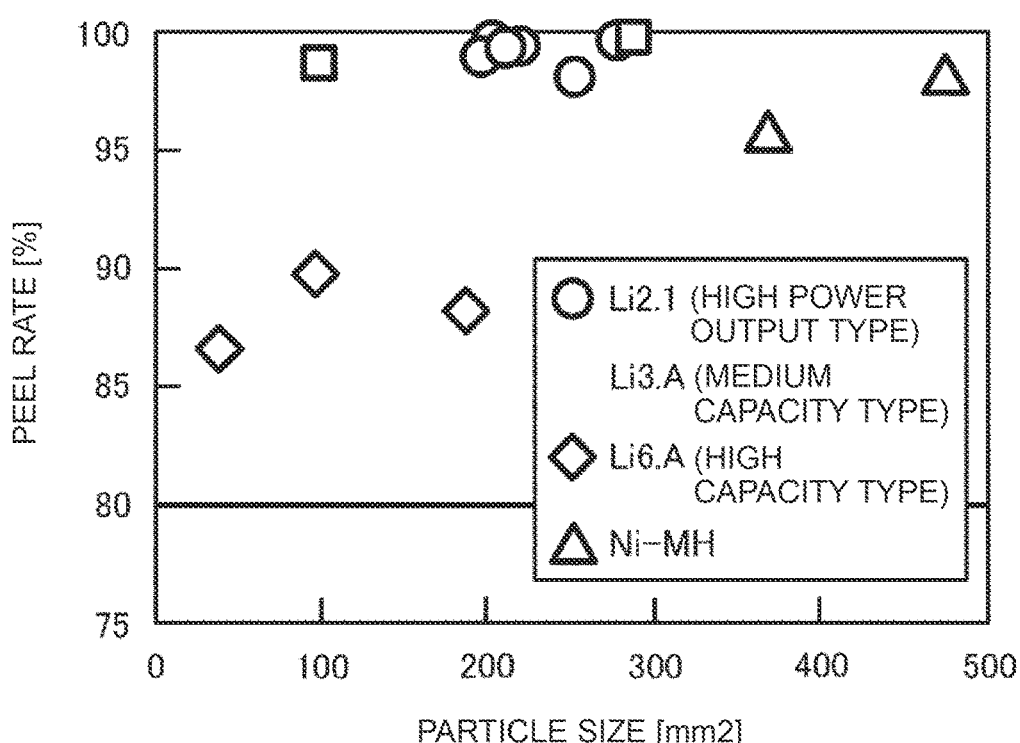
FIG. 6 is a diagram illustrating results of a peel test performed by a hammer crusher according to an embodiment of the present disclosure.

FIG. 6 is a diagram showing the results of a peel test performed by the hammer crusher 10. In the test, a hammer 30 having a 6 mm angle R was used, a screen 20 having a 5 mm opening was used, and the rotational velocity of the hammer 30 was set to 1100 rpm. Lithium-ion batteries and nickel metal hydride batteries were used as test pieces.

In the peeling test, the electrode material was pulverized by the hammer crusher 10 to peel the active material from the current collector, and the peeling rate thereof was investigated. The specimens used in the peel test are high-power lithium-ion batteries (Li2.1), medium-capacity lithium-ion batteries (Li3.A), high-capacity lithium-ion batteries (Li6.A), and nickel metal hydride batteries (Ni—MH). The horizontal axis of the graph of the test results is the particle size of the pulverized electrode material. The test results show that a peel rate of more than 80%, which is the target value, is obtained in all samples. That is, from the test results, it was confirmed that the hammer crusher 10 can recover the active material with a high recovery rate.

It should be noted that the test results of the hammer crusher 10 described above may also be considered to be applicable to the chain crusher 40.

What is claimed is:

1. A crushing and classifying device comprising
   a crushing chamber into which an electrode material of a secondary battery is introduced;
   a rotating shaft that is disposed in the crushing chamber and that rotates by receiving a driving force;

a striking body having a rod shape or a chain shape, one end of the striking body being rotatably connected to the rotating shaft, the striking body being configured to crush the electrode material in the crushing chamber by striking the electrode material while rotating in the crushing chamber by receiving a centrifugal force accompanying rotation of the rotating shaft; and a screen that is provided on a wall surface of the crushing chamber and that classifies the crushed electrode material, wherein:

the striking body includes an edge portion provided with an angle R whose radius of curvature is 1 mm or more and 9 mm or less at least at a distal end of the striking body; and the screen has an opening that is equal to or less than 5 mm.

2. The crushing and classifying device according to claim 1, wherein the edge portion is provided with the angle R whose radius of curvature is 1 mm or more and 9 mm or less in an entire portion that contacts the electrode material when the striking body rotates.

3. The crushing and classifying device according to claim 1, wherein the radius of curvature of the edge portion is 4 mm or more and 8 mm or less.

4. A method for crushing and classifying an electrode material of a secondary battery using a crushing and classifying device comprising:

a crushing chamber into which the electrode material is introduced;

a rotating shaft that is disposed in the crushing chamber and that rotates by receiving a driving force, a striking body having a rod shape or a chain shape, one end of the striking body being rotatably connected to the rotating shaft, the striking body being configured to crush the electrode material in the crushing chamber by striking the electrode material while rotating in the crushing chamber by receiving a centrifugal force accompanying rotation of the rotating shaft including an edge portion provided with an angle R whose radius of curvature is 1 mm or more and 9 mm or less at least at a distal end of the striking body, and a screen that is provided on a wall surface of the crushing chamber and that classifies the crushed electrode material produced by the striking body, the screen having an opening that is equal to or less than 5 mm, the method comprising:

a step of introducing the electrode material into the crushing chamber;

a step of crushing the electrode material by rotating the striking body for a predetermined time;

a step of sieving the crushed electrode material on the screen; and a step of separately collecting powder sieved from the crushed electrode material and a residue in the crushing chamber.

* * * * *